H. ANSCHÜTZ-KAEMPFE.
DEVICE FOR RECORDING THE PATHS OF SHIPS.
APPLICATION FILED SEPT. 9, 1910.

1,069,842.

Patented Aug. 12, 1913.

2 SHEETS—SHEET 1.

WITNESSES.
G. V. Rasmussen
Louis Alexander

INVENTOR
Hermann Anschütz-Kaempfe
BY
Briesen & Knauth
ATTORNEYS

H. ANSCHÜTZ-KAEMPFE.
DEVICE FOR RECORDING THE PATHS OF SHIPS.
APPLICATION FILED SEPT. 9, 1910.
1,069,842.
Patented Aug. 12, 1913.
2 SHEETS—SHEET 2.
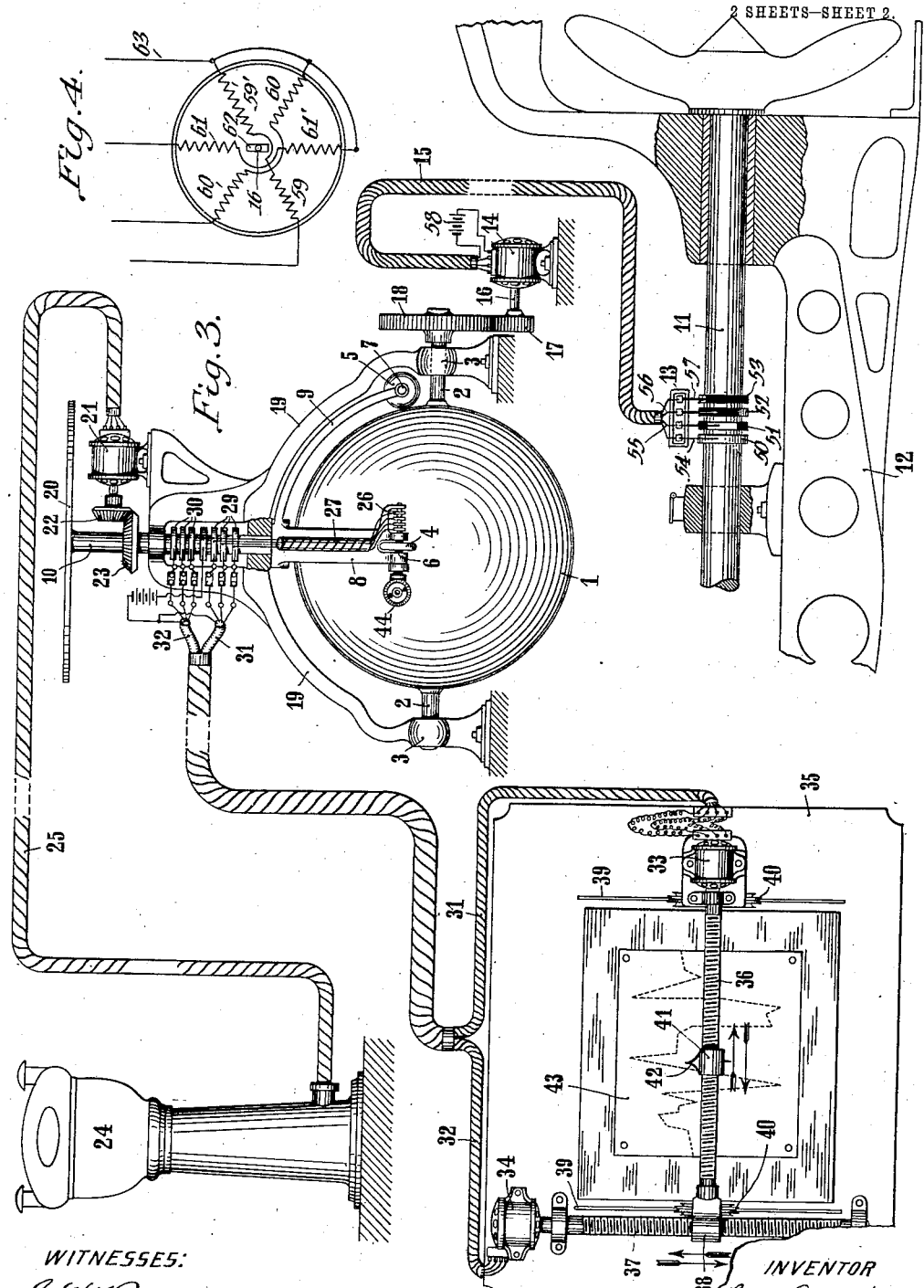
WITNESSES:
G. V. Rasmussen
Louis Alexander
INVENTOR
Hermann Anschütz-Kaempfe
BY
Bonesen + Vincent
ATTORNEYS.

UNITED STATES PATENT OFFICE.

HERMANN ANSCHÜTZ-KAEMPFE, OF NEUMÜHLEN, NEAR KIEL, GERMANY.

DEVICE FOR RECORDING THE PATHS OF SHIPS.

1,069,842.      Specification of Letters Patent.      Patented Aug. 12, 1913.

Application filed September 9, 1910. Serial No. 581,201.

*To all whom it may concern:*

Be it known that I, HERMANN ANSCHÜTZ-KAEMPFE, a subject of the Emperor of Germany, residing at Heikendorfer Weg 9, in Neumühlen, near Kiel, Germany, have invented certain new and useful Improvements in or Relating to Devices for Recording the Paths of Ships, of which the following is a specification.

This invention relates to a device for automatically recording the path traveled by a ship, from the indication of the speed of traveling and direction of traveling at the moment. The distance traveled by the ship is determined in the well known manner, for instance by the revolutions of the propellers or by the log, while the course steered is indicated by a magnet- or gyroscopic compass, or still better, by a compass transmission developing sufficient rotary movement.

The working of the device is based on the resolution or splitting up of the path of the ship by means of a spherical surface into two components, one of which coincides with the N. S. line and the other with the E. W., line, and on the resultant of the components being then again drawn on a map by means of a writing device.

Figure 1:
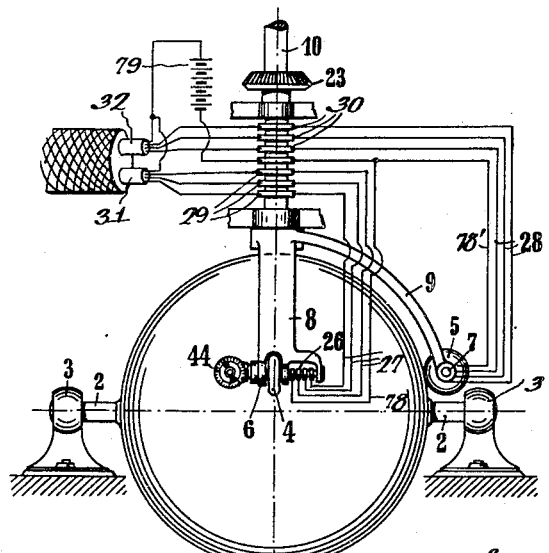
Figure 5:
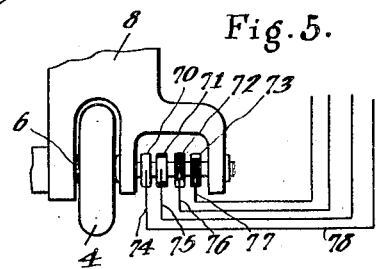
Figure 2:
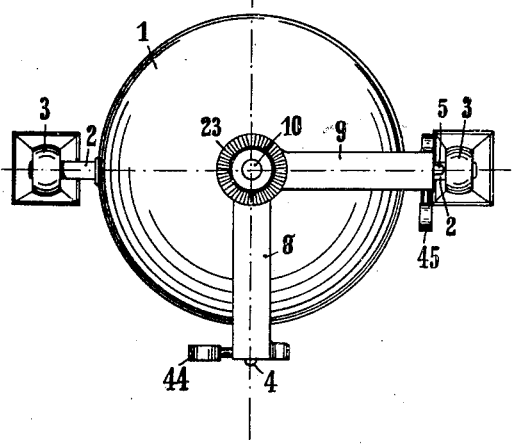

In the accompanying drawings, Figure 1 (which is an elevation) and Fig. 2 (which is a plan) show the device diagrammatically, while Fig. 3 shows a construction of a complete installation embodying the device shown in Figs. 1 and 2 and including a gyroscope-compass-transmission as well as an electric transmission for transmitting the revolutions of the propeller shaft. Fig. 4 shows diagrammatically the electrical system of the electrical receiving device which serves to rotate the ball in correspondence with the rotation of the propeller shaft. Fig. 5 shows diagrammatically and on an enlarged scale the transmitting device by means of which the several receiving devices are controlled.

A ball 1 (Figs. 1 and 2) is rotatably mounted on a spindle 2 in bearings 3 and is driven in any desired manner in a given ratio to the speed of the ship's propeller shaft. On the surface of the said ball, roll two wheels 4 and 5 arranged at an angle of 90° relatively to each other. Their planes intersect therefore, at a right angle. The wheels are mounted with their spindles 6 and 7 in arms 8 and 9 which are both secured to a rotatable spindle 10, which is shifted by a compass card. The wheels are pressed by the resiliency of the arms 8 and 9 or by some other suitable spring, with a sufficient pressure against the surface of the ball so as to insure their being driven by friction with the latter.

The speed of rotation of the ball, as already stated, is in a constant ratio to the speed of the ship. Its circumferential speed, that is to say the speed of movement of individual points of the surface, decreases however from the equator (the circle of intersection of a central line imagined to be passing at a right angle to the axis of rotation 2 through the balls) to the poles (the points of intersection of the axis 2 with the surface of the ball) in accordance with the law of sines. The speed with which the wheels 4 and 5 are driven by friction by the surface of the ball, will therefore change accordingly from zero to the speed of the points situated on the equator of the ball, for the surface movement of the ball brings about a rolling of the same on the surface in as far as it (the movement) is in the plane of the wheels. If the wheels are in the position shown in Fig. 1, the wheel 4 will have the highest speed, while the wheel 5 the minimum speed or zero. If the spindle 10 with the arms 8 and 9 is turned by the compass card, the speeds of the wheels 4 and 5 will be altered in accordance with the law of sines; the speed of the wheel 4 will decrease, while that of the wheel 5 will increase. If the ball is arranged in such manner that its equator coincides with or is parallel to the mid-ship line, the speed of rotation of the wheels will be in proportion to the N. S. and E. W. speed of the ship. For recording or marking the course of the ship, it is therefore merely necessary to move a recording or writing device in accordance with the speed of the two wheels at any moment. This can be effected for instance by means of an electric transmission device which moves a writing pencil on the coördinates of a writing surface.

Fig. 3 shows by way of example as already stated an installation embodying the device just described. The propeller shaft 11 suitably supported on the ship's frame 12 carries parts of an electrical transmitting device 13. This device consists, in the example shown, of four slip rings 50, 51, 52 and 53 arranged side by side upon the shaft and they slidably engage with independently supported corresponding springs 54, 55, 56 and 57. Ring 50 is of metal and spring 54 engaged therewith is connected with one pole of a suitable current source 58 through a conductor of a multi-conductor cable 15. This current source 58 may be either a battery, as shown, or connection may be made to any suitable commercial circuit or generator. Slip rings 51, 52 and 53 consist of metallic segments covering 120° of arc and insulating material such as ebonite, for example, for the other 240° of arc. The three rings are mounted so that the metallic segments are successively, peripherally offset by 120°; each segment is electrically connected with the metallic ring 50. As shaft 11 rotates, therefore, current from the source 58 passes through spring 54 to ring 50 and successively through the segments of rings 51, 52 and 53 to springs 55, 56 and 57. Said springs 55, 56 and 57 are electrically connected by wires of the cable 15 with the receiver 14. This receiver comprises (Fig. 4) three pair of electro-magnets, viz., 59—59', 60—60', and 61—61' uniformly spaced about an armature 62 fixed to axle 16. Each of these magnet pairs has one end of its windings connected with one of the springs 55, 56 and 57 while a common return circuit 63 joins the remaining ends of each winding to the generator 58. As shaft 11 rotates, therefore, each magnet pair will be successively excited and the armature 62 will rotate in correspondence with the rotating field thus established, with a speed which, for the particular arrangement shown, will be one-half that of shaft 11. By altering the number of magnet pairs and the number of segments of the transmitter device, the ratio between the speeds of the receiver 14 and the shaft 11 may be correspondingly altered. On the spindle 16 is mounted a toothed wheel 17 engaging with a second toothed wheel 18 keyed to the spindle forming the axis of rotation 2 of the ball 1. The spindle forming the axis of the ball will therefore be rotated in a given ratio to the speed of the ship's propeller shaft 11.

The spindle 10 carrying the two arms 8 and 9 with the rolling wheels 4 and 5 is rotatably mounted in a frame 19 secured, according to the diagrammatic illustration in the drawing, to the bearings 3 of the ball spindle 2. The spindle 10 which carries at the upper end a compass card, is driven from the receiver 21 of any compass transmission device, say by means of toothed wheel gear 22, 23. A compass (magnetic or gyroscopic compass) is marked 24 and is connected to the receiver 21 by means of a cable 25. The construction of the compass transmission itself can be any desired, the only condition is that the transmission device should move the card 20 of the subsidiary compass with the spindle 10, and therefore with the arms 8 and 9, exactly in agreement with the main compass 24.

The speed of rotation of the wheels 4 and 5 at any moment must be transmitted to a writing or some other indicating or recording device. In the construction illustrated, this is again effected by means of electric transmission device. The spindles 6 and 7 of the wheels 4 and 5 carry electric transmitters 26. One of these is shown on an enlarged scale in Fig. 5. The construction is similar to that above described for the transmitting arrangement attached to shaft 11. The spindle 6 carries four slip rings 70, 71, 72, 73, the ring 70 being metallic, while the remaining rings comprise 120° metallic segments successively offset peripherally by 120°, the remaining arc of each ring being filled in with insulation. Springs 74, 75, 76 and 77 slidably engage the four slip rings and are connected, spring 74 to one pole by current source 79 (which may be identical with source 58) and springs 75, 76 and 77 by means of a cable 27 to three metallic slip rings 29 on shaft 10. These last named slip rings 29 have sliding contact respectively with three springs electrically connected by a cable 31 with the receiver 33. Receiver 33 corresponds in its construction to the receiver shown in Fig. 4 and above described. Connections coming from springs 75, 76 and 77 are connected with magnet pairs 59, 59', 60, 60', 61, 61', while a common return conductor 63 is connected through the cable 31 with the remaining pole of generator 79. The armature of receiver 33 is thereby caused to rotate at a speed proportional to that of wheel 4 in exactly the same manner as has already been explained with reference to the armature of receiver 14. The movement of spindle 7 is transferred to the rings of receiver 34 by a system identical with that just described for spindle 6.

The receivers 33 and 34 are mounted on a bed-plate 35, the receiver 34 being rigidly secured to it while the receiver 33 is mounted in a transversely adjustable manner. The receiver spindles are connected to worms 36 and 37, the worm 37 carries a nut 38 to which is secured the worm 36 arranged at a right angle to the worm 37. If, therefore, the worm 37 is rotated by the receiver 34, the worm 36 with the nut 38 and also the receiver motor 33 will be shifted on the bed-plate 35. Parallel movement is insured by means of rails 39 on which are guided on the one hand the receiver 33 by means of the wheels 40, and on the other hand the nut 38. Finally on the worm 36 is mounted a nut 41 with a pencil 42 resting on a writing surface 43.

When the installation is working, the worms 36 and 37 are driven in an exact ratio to the speed of the wheels 4 and 5, and will therefore shift the pencil 42 exactly in accordance with the ship's speed at the moment in the N. S. and E. W. direction. The curve drawn by the pencil gives, therefore, on a given well known scale, an exact representation of the movement of the ship. On the spindles 6 and 7 of the roller wheels could also be mounted counting mechanisms 44 and 45 which for instance sum up all the revolutions in the clockwise direction while deducting all the revolutions in the opposite direction. As the proportion of the revolutions of the ball 1 to those of the ship's propeller shaft 11 is well known, the indications of the said counting mechanism could be used direct for determining the position of the ship at the moment without a writing device. By calculating from the rate of transmission, the new position of the ship can be found at any moment of the map, namely by marking down from the original position of the ship one distance given by the counting mechanism 44, for instance as a line parallel to the meridian, and by drawing at the end of the said line the other distance indicated by the counting mechanism 43, in a direction parallel to the latitude. It is immaterial what evolutions of the ship may have taken place in the meantime, as all the courses are always resolved into these two components. The two counting mechanism 44 and 45 could also be mounted on the receiver motors 33 and 34, their indications being used in the same way.

That what I claim and pray to secure by Letters Patent is:

1. A device for automatically recording a ship's path, comprising a ball, means for rotating the same in proportion to the ship's speed, means engaging with the surface of said ball for resolving the direction of travel of the ship into two components of fixed direction relatively to the compass card, and means for subsequently finding the resultant of said components and recording it on a writing surface.

2. A device for automatically recording a ship's path, comprising a ball, means for rotating the same in proportion to the ship's speed, two friction wheels, arranged at an angle of 90° relatively to each other, rolling on the surface of said ball, a direction indicator adapted to adjust said wheels relatively to the equator of the ball, means adapted to write upon a suitable surface, and means, controlled by said wheels, for moving said writing means in two directions fixed relatively to the compass card.

3. A device for automatically recording a ship's path, comprising a ball, means for rotating the same in proportion to the ship's speed, two friction wheels, arranged at an angle of 90° relatively to each other, rolling on the surface of said ball, a direction indicator adapted to adjust said wheels relatively to the equator of the ball, means adapted to write upon a suitable surface, and electric transmission devices for moving said writing device in correspondence with the speed of rotation of said wheels and in such manner that the latter is moved by one wheel in the N. S. direction and by the other wheel in the E. W. direction.

4. A device for automatically recording a ship's path, comprising a ball, means for rotating the same in proportion to the ship's speed, two friction wheels, arranged at an angle of 90° relatively to each other, rolling on the surface of said ball, a direction indicator adapted to adjust said wheels relatively to the equator of the ball, means adapted to write upon a suitable surface, two worms arranged to respectively move said writing means in directions perpendicular to one another, one of said worms being further adapted to move the other worm parallel to itself, and electrical transmitter devices for rotating said worms in correspondence with the speed of rotation of said wheels.

5. A device for automatically recording a ship's path, comprising a ball, means for rotating the same in proportion to the ship's speed, two friction wheels, arranged at an angle of 90° relatively to each other, rolling on the surface of said ball, a direction indicator adapted to adjust said wheels relatively to the equator of the ball, means adapted to write upon a suitable surface, two worms arranged at an angle to each other and adapted to move said writing means in two directions i. e., N. S. and E. W., and one of said worms being adapted to move the other worm in a parallel direction, electric transmission devices for moving said worms in correspondence with the speed of rotation of said wheels, and a counting mechanism connected to each friction wheel for adding the revolutions in one direction and deducting those in the opposite direction, for the purposes specified.

6. A device for automatically recording a ship's path, comprising a ball adapted to be rotated proportionally to the ship's speed, means engaging with the surface of said ball for resolving the direction of travel of the said ship into two components of fixed direction relatively to the compass card, and means for subsequently recording the resultant of said components upon a writing surface.

7. A device for automatically recording a ship's path, comprising a ball, means for rotating the same in proportion to the ship's speed, two friction wheels arranged at an angle of 90° relatively to each other, rolling on the surface of said ball, a direction indicator adapted to adjust said wheels relatively to the equator of said ball, means adapted to write upon a suitable surface, a worm connected to said writing means for moving it along said worm, and a second worm connected to said writing means for for moving the latter parallel to itself, and electric transmission devices for moving said worms in correspondence with the speed of rotation of the said wheels.

In witness whereof I have hereunto signed my name this 24th day of August 1910 in the presence of the two subscribing witnesses.

HERMANN ANSCHÜTZ-KAEMPFE.

Witnesses:
　　JULIUS RÖPKE,
　　VIKTOR P. ALMGREN.